United States Patent
Kim et al.

(10) Patent No.: US 7,845,455 B2
(45) Date of Patent: Dec. 7, 2010

(54) EXTERIOR AIRBAG FOR VEHICLES

(75) Inventors: Yong Sun Kim, Namyangju-si (KR); Jun Yeol Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 43 days.

(21) Appl. No.: 12/479,419

(22) Filed: Jun. 5, 2009

(65) Prior Publication Data

US 2010/0052294 A1    Mar. 4, 2010

(30) Foreign Application Priority Data

Sep. 4, 2008    (KR)    ............... 10-2008-0087281

(51) Int. Cl.
*B60K 28/10* (2006.01)
(52) U.S. Cl. .................................. 180/274
(58) Field of Classification Search ......... 180/271, 180/274, 282; 280/735
See application file for complete search history.

(56) References Cited

U.S. PATENT DOCUMENTS

| 3,822,076 A * | 7/1974 | Mercier et al. ............... 293/107 |
| 5,646,613 A * | 7/1997 | Cho ............................. 340/903 |
| 5,732,785 A * | 3/1998 | Ran et al. ..................... 180/271 |
| 7,232,001 B2 * | 6/2007 | Hakki et al. .................. 180/271 |
| 7,753,159 B2 * | 7/2010 | Kim et al. ..................... 180/274 |
| 2004/0074690 A1 * | 4/2004 | Sato et al. ..................... 180/274 |
| 2005/0087998 A1 * | 4/2005 | Curry et al. .................. 293/107 |
| 2005/0230940 A1 * | 10/2005 | Alexander et al. ........ 280/730.1 |
| 2009/0152041 A1 * | 6/2009 | Kim ............................. 180/274 |
| 2009/0267366 A1 * | 10/2009 | Vodavoz ..................... 293/132 |

FOREIGN PATENT DOCUMENTS

JP    2006088897 A  *  4/2006
JP    2009220645 A  *  10/2009

* cited by examiner

*Primary Examiner*—Faye M. Fleming
(74) *Attorney, Agent, or Firm*—Morgan, Lewis & Bockius LLP

(57) ABSTRACT

An exterior airbag for vehicles is deployed forwards in the front of a vehicle just before a collision of the vehicle. The exterior airbag may include a plurality of airbag housings mounted to a bumper of the vehicle, a plurality of airbag cushions received in respective airbag housing and configured to at least encircle a front surface of the bumper while forming overlapping portions at adjacent sides of the airbag cushions when the airbag cushions are fully deployed, and at least an inflator providing a deploying force to each of the airbag cushions.

10 Claims, 4 Drawing Sheets

EXTERIOR AIRBAG FOR VEHICLES

CROSS-REFERENCE TO RELATED APPLICATION

The present application claims priority to Korean Patent Application Number 10-2008-0087281, filed on Sep. 4, 2008, the entire contents of which is incorporated herein for all purposes by this reference.

BACKGROUND OF THE INVENTION

1. Field of the Invention

The present invention relates to an exterior airbag for vehicles, which is deployed forwards in the front of a vehicle just before a collision of the vehicle.

2. Description of Related Art

Generally, a vehicle is provided with a variety of safety devices for protecting a driver and passengers when an unexpected accident of the vehicle occurs. A representative example of the safety devices is an airbag, which can protect a driver or a passenger who is seated in a front passenger seat of a vehicle.

The airbag is configured such that, when a vehicle collides with another vehicle or an object, pressurized gas is instantaneously injected into an airbag cushion in response to collision shock and the airbag cushion is quickly inflated by the pressurized gas, thus covering the front portion of a driver or a passenger seated in the front passenger seat of the vehicle and protecting the driver or the passenger from a windshield glass or an object placed in front of the vehicle.

Conventional airbags are interior airbags, which are installed inside the passenger compartment of a vehicle and are deployed inside the passenger compartment so as to protect a driver and passengers seating inside the passenger compartment. However, the interior airbags cannot protect vehicle bodies, which collide with each other, or persons outside the colliding vehicle which is equipped with the interior airbags. Described in brief, the interior airbags cannot protect vehicle bodies and people outside colliding vehicles.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an exterior airbag for vehicles, which is deployed forwards in the front of a vehicle just before a collision of the vehicle, thus absorbing shock imposed on a vehicle body and reducing damage to passengers.

In an aspect of the present invention, the exterior airbag for a vehicle may include a plurality of airbag housings mounted to a bumper of the vehicle, a plurality of airbag cushions received in respective airbag housing and configured to at least encircle a front surface of the bumper while forming overlapping portions at adjacent sides of the airbag cushions when the airbag cushions are fully deployed, and at least an inflator providing a deploying force to each of the airbag cushions The airbag cushions may include two airbag cushions provided in opposite sides of the bumper, and wherein the overlapping portions include a rear overlapping portion protecting a portion of the front surface of the bumper where the two airbag cushions are adjacent and a front overlapping portion overlapping a forward surface of the rear overlapping portion wherein the front overlapping portion and the rear overlapping portion form an inclined surface therebetween, the inclined surface extending toward the bumper when the airbag cushions are fully deployed.

The inflator includes a rod-shaped gas distributor transversely mounted to the vehicle, with a plurality of gas distributing holes formed in the gas distributor at regular intervals so as to evenly distribute airbag gas into the airbag cushion, wherein each of the airbag housings is provided with a cushion holder for supporting the gas distributor, and the airbag cushions are securely installed between the airbag housings and respective cushion holders and wherein the cushion holder is disposed inside the airbag housing.

The airbag housing may be provided with an airbag door so as to be opened when the airbag cushion is deployed, the airbag door being mounted at an upper end thereof to an upper end of the bumper and coupled at a lower end thereof to the airbag housing using a clip and bolted to a lower part of the bumper, so that, when the airbag cushion is deployed, the upper end of the airbag door is separated from the bumper while the lower end of the airbag door remains in a state coupled to the airbag housing.

In another aspect of the present invention, the exterior airbag for vehicles may further include a sensing unit for sensing a speed and a distance of a driver's own vehicle and a speed and a distance of an object and outputting sensing signals and a control unit for determining by using the sensing signals whether the driver's own vehicle is in a state just before a collision with the object or not and outputting an airbag cushion deploying signal, wherein the sensing unit includes an object sensor for sensing the speed and distance of the object and a driver's own vehicle sensor for sensing the speed and distance of the driver's own vehicle.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
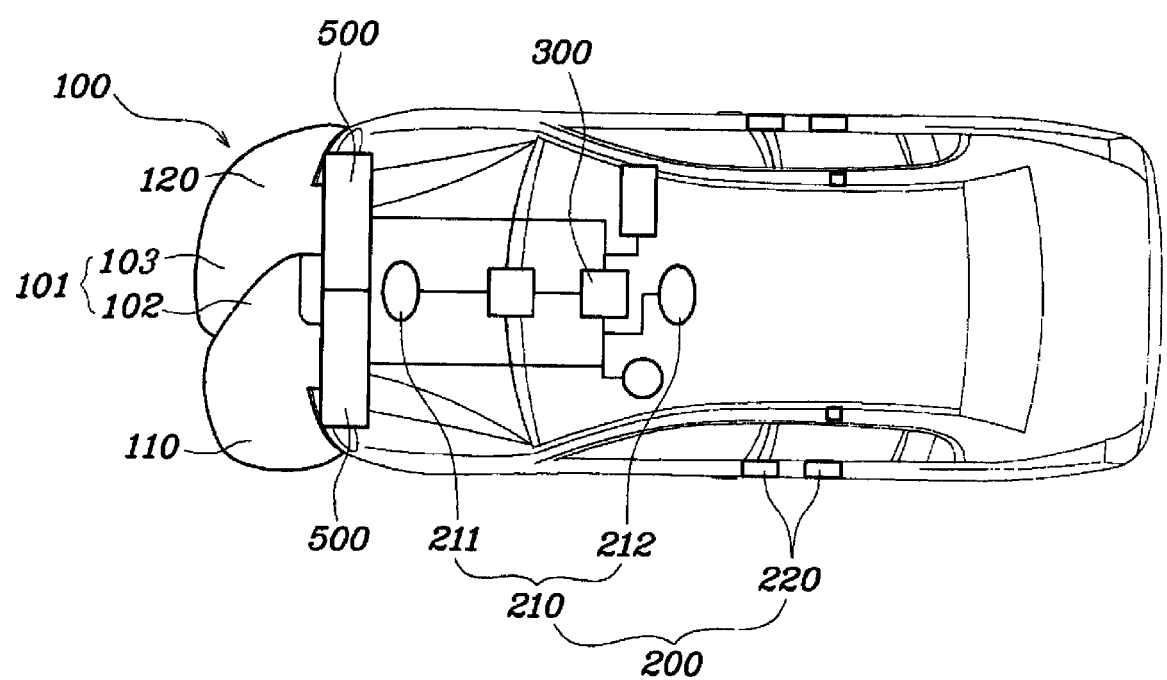
FIG. 1 is a view illustrating the construction of an exemplary exterior airbag for vehicles according to the present invention.
Figure 2:
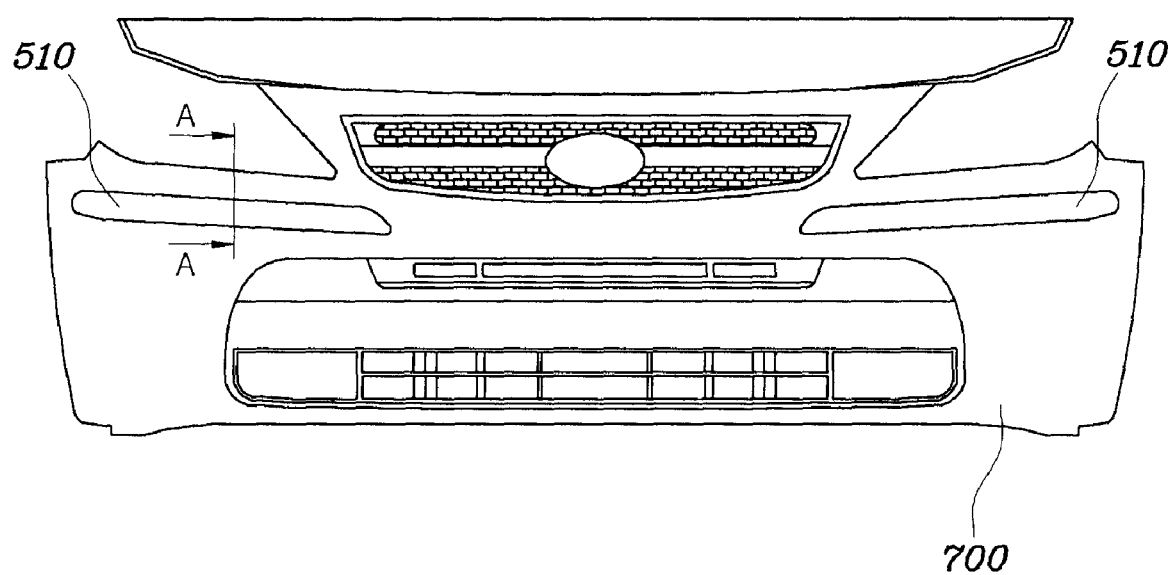
FIG. 2 is a front view illustrating a vehicle bumper equipped with an exemplary exterior airbag according to the present invention.
Figure 3:
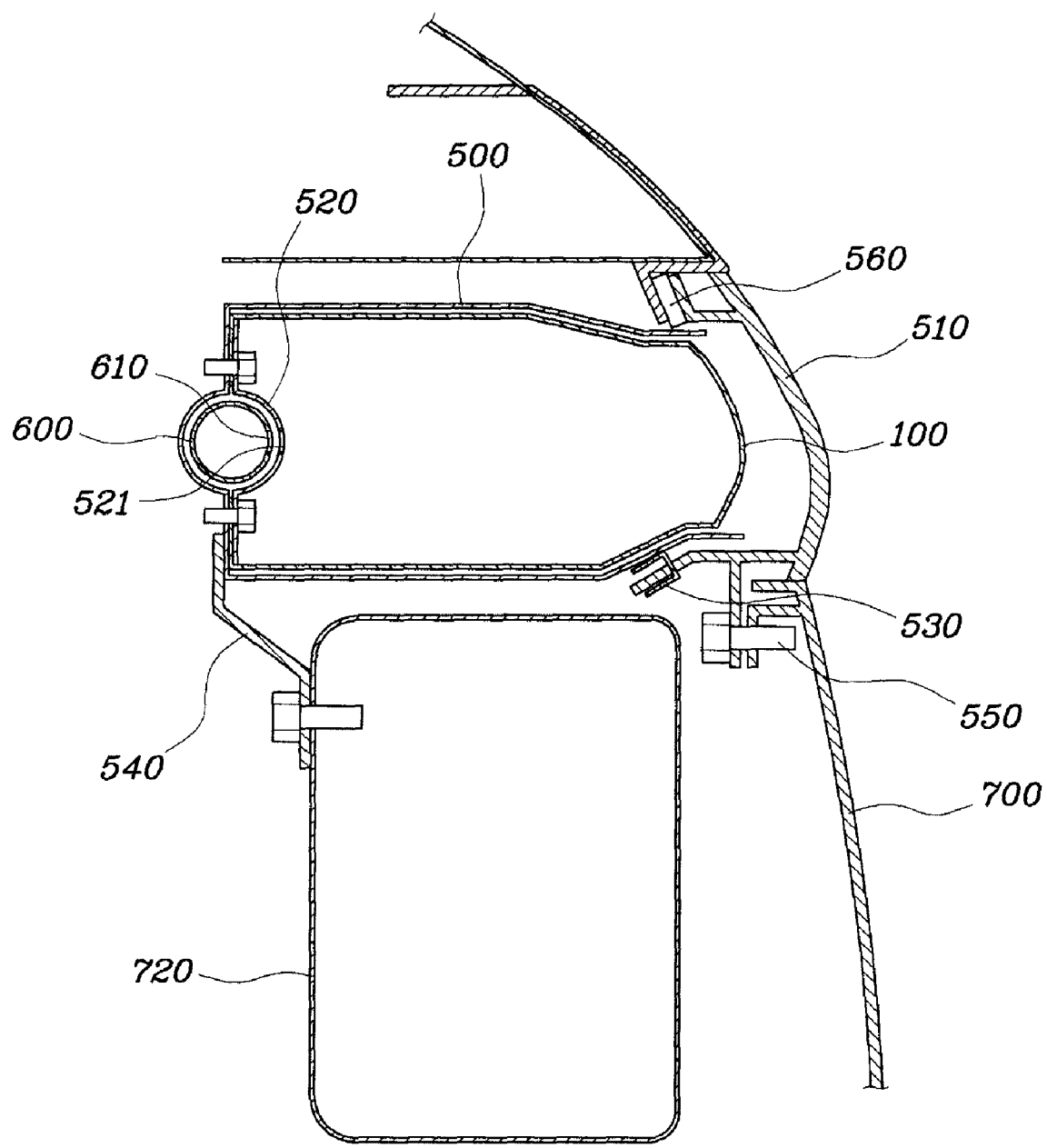
FIG. 3 is a sectional view taken along line A-A of FIG. 2.
Figure 4:
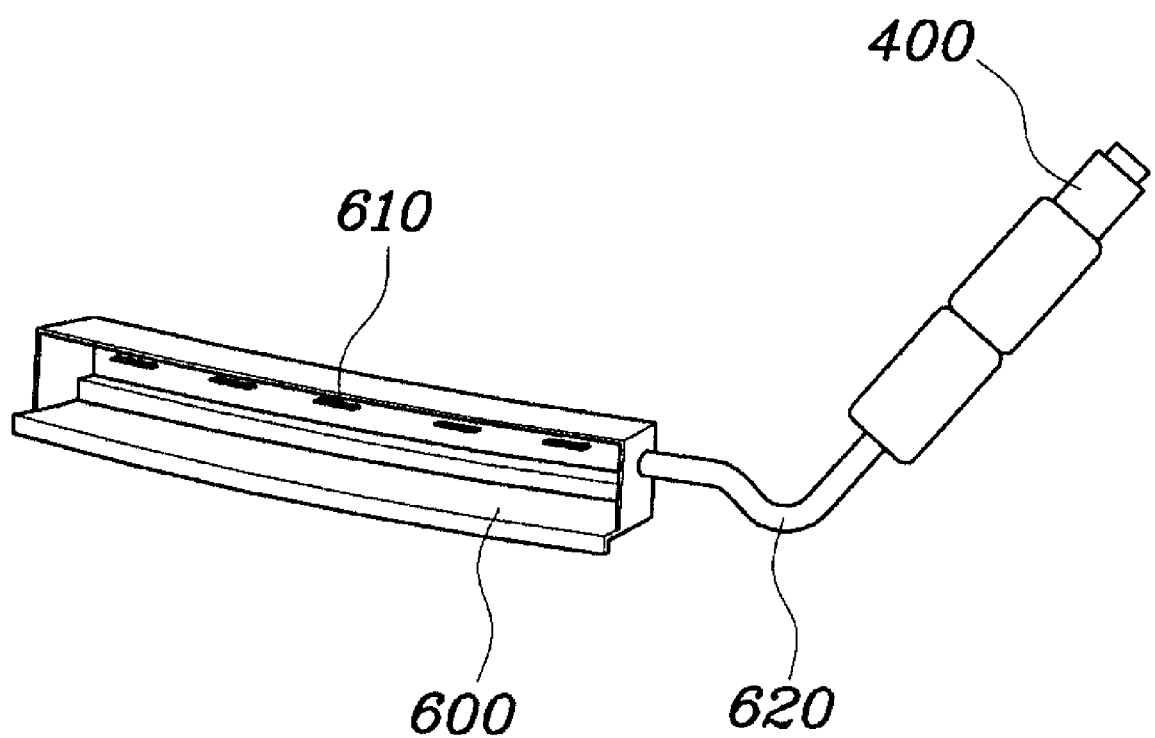
FIG. 4 is a view illustrating the construction of a gas distributor of an exemplary exterior airbag for vehicles according to the present invention.

As shown in FIGS. 1 through 4, an exterior airbag for vehicles according to the present invention is characterized in that an airbag cushion 100 is provided in a vehicle bumper 700 and is deployed forwards from the bumper 700 just before a collision of a vehicle, thus protecting the passengers and vehicle body of the vehicle having the exterior airbag and, furthermore, protecting the passengers and vehicle body of another vehicle, which collides with the vehicle having the exterior airbag.

In order to realize the object of the present invention, the exterior airbag for vehicles comprises a plurality of airbag housings 500 mounted to a vehicle bumper 700, a plurality of airbag cushions 100 received in respective airbag housings 500 and forming overlapping portions 101 at neighboring sides thereof when the airbag cushions 100 are fully deployed, and an inflator 400 for providing a deploying force to each of the airbag cushions 100.

Described in detail, the airbag cushions 100 are deployed forwards from the vehicle bumper 700 just before a collision of the vehicle, thus absorbing shock generated from between the vehicle and another vehicle or an object which collides with the vehicle. In various embodiments of the present invention, the airbag cushions 100 comprise two airbag cushions, which are a first airbag cushion 110 and a second airbag cushion 120 provided in opposite sides of the vehicle bumper 700. Each of the two airbag cushions 100 forms an inclined shape leaning to the center of the bumper 700 when the airbag cushions 100 are fully deployed forwards. Thus, when the two airbag cushions 100 are fully deployed forwards, the two airbag cushions 100 partially overlap each other in front of the center of the bumper 700 and protect the entire portion of the front surface of the bumper 700.

Particularly, when the first airbag cushion 110 and the second airbag cushion 120 are fully deployed forwards, overlapping portions 101 are formed in the neighboring sides of the two cushions 110 and 120 such that the two deployed cushions 110 and 120 can cover the entire portion of the front surface of the vehicle bumper 700. The overlapping portions 101 comprise a rear overlapping portion 102, which is formed in the first airbag cushion 110 so as to cover the center of the front surface of the bumper 700, and a front overlapping portion 103, which is formed in the second airbag cushion 120 and overlaps the rear overlapping portion 102 so as to cover the front surface of the rear overlapping portion 102.

As described above, the rear overlapping portion 102 and the front overlapping portion 103, at which the airbag cushions 100 overlap each other when the cushions 100 are fully deployed, are located in the central area of the front surface of the vehicle bumper 700, thus efficiently protecting passengers of vehicles in the case of a head-on collision of the vehicles.

The airbag cushions 100 are installed in respective airbag housings 500, which are provided in opposite ends of the vehicle bumper 700. Each of the airbag housings 500 has a longitudinal housing shape and is placed along a width direction in the front of the vehicle and is open in a front end thereof. Each of the airbag housings 500, which receive respective airbag cushions 100 therein, is mounted to a bumper back beam 720 through a mounting bracket 540.

Further, the open front end of each of the airbag housings 500 is provided with an airbag door 510, which is opened when an associated airbag cushion 100 is deployed forwards from the airbag housing 500. The airbag door 510 is mounted at the upper end thereof to the vehicle bumper 700 using a double-sided adhesive material 560 or a bolt. The lower end of the airbag door 510 is coupled to the airbag housing 500 using a clip 530 and is also locked to the vehicle bumper 700 using a locking bolt 550. When the airbag cushion 100 is inflated, the upper end of the airbag door 510 is separated from the vehicle bumper 700 due to pressure of the inflated airbag cushion 100 and, at the same time, the clip 530 is separated from the airbag housing 500 so that the airbag door 510 is suspended from the locking bolt 550 of the vehicle bumper 700. In other words, when the airbag cushion 100 is inflated, the airbag housing 500 is opened and the airbag cushion 100 is deployed forwards from the vehicle bumper 700 through the opening of the airbag housing 500 so that the cushion 100 can absorb collision shock.

Further, an inflator 400 is connected to each of the airbag housings 500 so as to supply airbag gas to each of the airbag cushions 100. The inflator 400 is mounted to a wheel side panel of the vehicle and is exploded in response to a deploying signal output from a control unit 300 and supplies airbag gas under pressure to the airbag cushion 100. In the above state, the airbag gas under pressure flows from the inflator 400 to a gas distributor 600 through a gas guide 620. The gas distributor 600 distributes airbag gas to the airbag cushion 100, which is placed in the airbag housing 500 along a longitudinal direction of the housing 500.

The gas distributor 600 is placed inside the airbag housing 500 along the longitudinal direction of the airbag housing 500 such that the gas distributor 600 is in parallel to the airbag cushion 100. A plurality of gas distributing holes 610 are formed in the gas distributor 600 along the longitudinal direction of the gas distributor 600 such that the holes 610 are spaced apart from each other at regular intervals, thus evenly distributing the airbag gas to the airbag cushion 100. Therefore, the airbag gas, supplied from the inflator 400 through the gas guide 620, can be efficiently distributed to the airbag cushion 100 by the gas distributor 600. In various embodiments of the present invention, the gas guide 620 may be integrated with the gas distributor 600 into a single structure.

The gas distributor 600 is supported in the airbag housing 500 by a cushion holder 520, which is mounted in the airbag housing 500. The cushion holder 520 has a bracket structure, which surrounds the gas distributor 600. The cushion holder 520 also has a plurality of gas holes 521 corresponding to the gas distributing holes 610 of the gas distributor 600 and is mounted to the airbag housing 500 using locking bolts. In various embodiments of the present invention, the locking bolts may lock the airbag cushion 100 to the airbag housing 500 in addition to locking the cushion holder 520 to the airbag housing 500.

The deployment of the airbag cushion 100, which is executed just before the vehicle collides with another vehicle or an object, is performed through operation of both a sensing unit 200 and the control unit 300.

Described in detail, the sensing unit 200 senses the speed and distance of a driver's own vehicle and the speed and distance of an object on a road, and outputs sensing signals to the control unit 300. To realize the above-mentioned function, the sensing unit 200 comprises an object sensor 210 for sensing the speed and distance of the object, and a driver's own vehicle sensor 220 for sensing the speed and distance of the driver's own vehicle.

Here, the object sensor 210 may use a radar sensor 211 capable of sensing the speed and distance of an object before a collision and a camera sensor 212 capable of capturing the image of the object. The driver's own vehicle sensor 220 may use a speed sensor, a steering angle sensor, a wheel speed sensor and a G-sensor (gravity sensor) capable of sensing the speed and distance of the driver's own vehicle.

In response to the sensing signals output from the sensing unit 200, the control unit 300 determines using the sensing signals whether the driver's own vehicle is in a state just before a collision or not. When it is determined that the driver's own vehicle is in a state just before a collision, the control unit 300 outputs deploying signals to respective inflators 400, thus letting the airbag cushions 100 be deployed forwards from the front surface of the vehicle.

Described in detail, the control unit 300 compares data of the driver's own vehicle, such as the speed, distance and steering angle of the driver's own vehicle, to data of the object, such as the speed and distance of the object. In the above state, when the relative speed between the driver's own vehicle and the object is equal to or higher than a reference value and the distance between the driver's own vehicle and the object is equal to or lower than a reference value, the control unit 300 determines that the driver's own vehicle is in a state just before a collision with the object, thus outputting deploying signals to respective inflators 400.

The above-mentioned operation of the present invention will be described in more detail as follows.

The sensing unit 200 senses the speed and distance of an object using the object sensor 210 and senses the speed and distance of the driver's own vehicle using the driver's own vehicle sensor 220, and outputs sensing signals to the control unit 300.

When the control unit 300 receives the sensing signals indicative of data of the driver's own vehicle and data of the object output from the sensing unit 200, the control unit 300 compares the data of the driver's own vehicle to the data of the object. In the above state, the control unit 300 calculates a relative speed between the driver's own vehicle and the object. When the relative speed is equal to or higher than a reference value and the distance between the driver's own vehicle and the object is equal to or lower than a reference value, the control unit 300 outputs deploying signals to respective inflators 400 just before the driver's own vehicle collides with the object.

In response to the deploying signals output from the control unit 300, the inflators 400 are exploded and supply airbag gas into respective airbag cushions 100. In other words, when airbag gas is supplied to each of the gas distributors 600 by operation of an associated inflator 400, the gas distributor 600 distributes the airbag gas to an associated airbag cushion 100 through the gas distributing holes 610, thus letting the airbag cushion 100 be evenly deployed from the front surface of the vehicle. Therefore, the exterior airbag for vehicles according to the present invention can protect the vehicle body and passengers of a driver's own vehicle and the vehicle body and passengers of another vehicle, which collides with the driver's own vehicle, thus minimizing damage to vehicle bodies and passengers in the case of a collision of vehicles.

For convenience in explanation and accurate definition in the appended claims, the terms "upper", "lower", "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exterior airbag for a vehicle, comprising:
   a plurality of airbag housings mounted adjacent a bumper of the vehicle;
   a plurality of airbag cushions received in respective airbag housing and configured to at least encircle a front surface of the bumper while forming overlapping portions at adjacent sides of the airbag cushions when the airbag cushions are fully deployed; and
   at least one inflator providing a deploying force to each of the airbag cushions.

2. The exterior airbag for vehicles according to claim 1, wherein the airbag cushions comprise two airbag cushions provided on opposite sides of the bumper, and wherein the overlapping portions comprise a rear overlapping portion protecting a portion of the front surface of the bumper where the two airbag cushions are adjacent and a front overlapping portion overlapping a forward surface of the rear overlapping portion.

3. The exterior airbag for vehicles according to claim 2, wherein the front overlapping portion and the rear overlapping portion form an inclined surface therebetween, the inclined surface extending toward the bumper when the airbag cushions are fully deployed.

4. The exterior airbag for vehicles according to claim 1, wherein the inflator comprises a rod-shaped gas distributor transversely mounted to the vehicle, with a plurality of gas distributing holes formed in the gas distributor at regular intervals so as to evenly distribute airbag gas into the airbag cushion.

5. The exterior airbag for vehicles according to claim 4, wherein at least one of the airbag housings is provided with a cushion holder for supporting the gas distributor, and the airbag cushions are securely installed between the airbag housings and respective cushion holders.

6. The exterior airbag for vehicles according to claim 5, wherein the cushion holder is disposed inside the airbag housing.

7. The exterior airbag for vehicles according to claim 5, wherein the airbag housing is provided with an airbag door so as to be opened when the airbag cushion is deployed, the airbag door being mounted at an upper end thereof to an upper end of the bumper and coupled at a lower end thereof to the airbag housing using a clip and bolted to a lower part of the bumper, so that, when the airbag cushion is deployed, the upper end of the airbag door is separated from the bumper while the lower end of the airbag door remains in a state coupled to the airbag housing.

8. The exterior airbag for vehicles according to claim 1, further comprising:
   a sensing unit for sensing a speed and a distance of a driver's own vehicle and a speed and a distance of an object and outputting sensing signals; and
   a control unit for determining by using the sensing signals whether the driver's own vehicle is in a state just before a collision with the object or not and outputting an airbag cushion deploying signal.

9. The exterior airbag for vehicles according to claim 8, wherein the sensing unit comprises an object sensor for sensing the speed and distance of the object and a driver's own vehicle sensor for sensing the speed and distance of the driver's own vehicle.

10. A passenger vehicle comprising the exterior airbag for vehicles according to claim 1.

* * * * *